United States Patent Office.

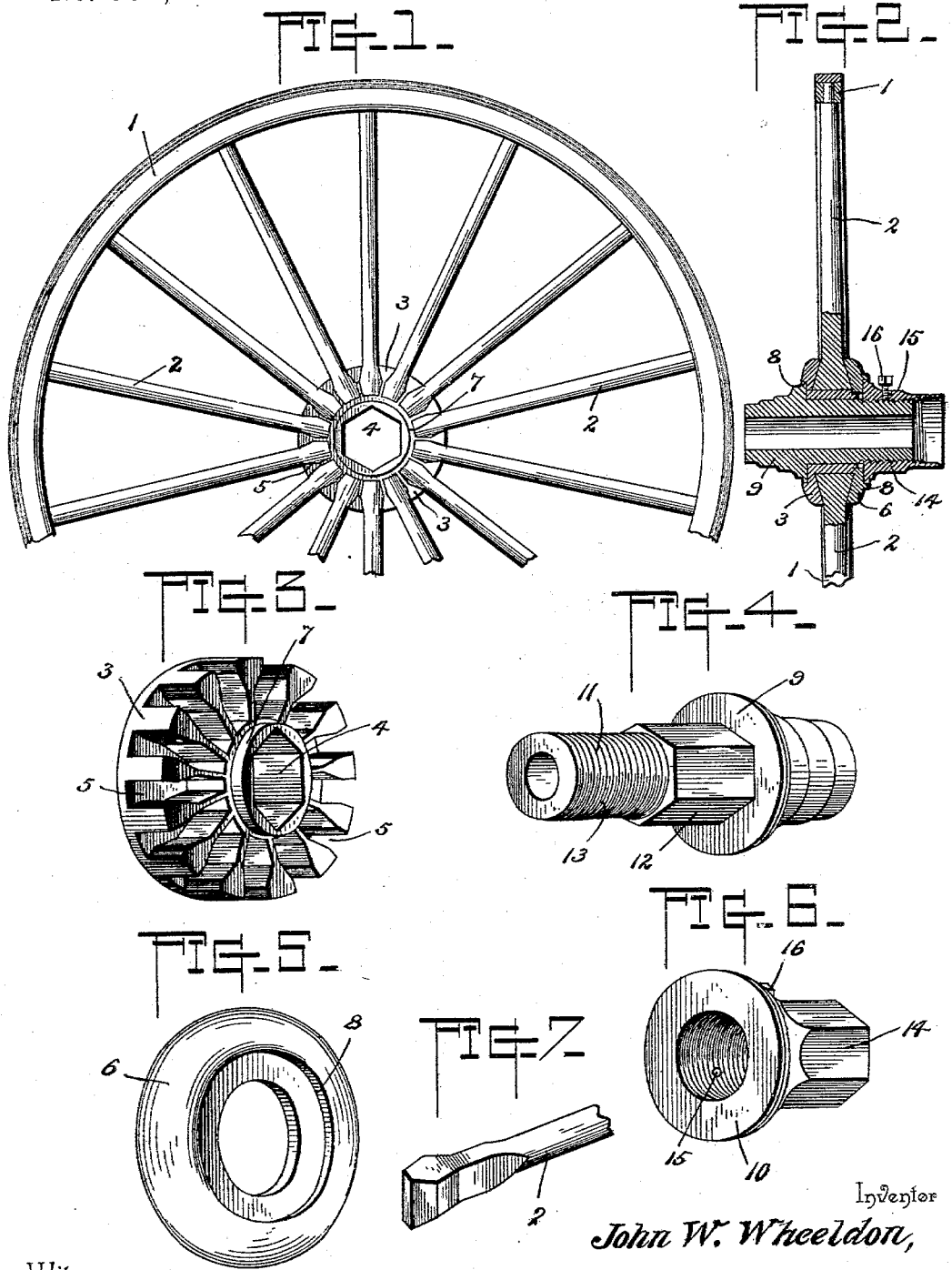

JOHN W. WHEELDON, OF COLORADO SPRINGS, COLORADO, ASSIGNOR OF ONE-FOURTH TO MAGGIE HARRINGTON, OF HARTSEL, COLORADO.

WHEEL.

SPECIFICATION forming part of Letters Patent No. 597,346, dated January 11, 1898.

Application filed August 26, 1896. Serial No. 604,021. (No model.)

*To all whom it may concern:*

Be it known that I, JOHN W. WHEELDON, a citizen of the United States, residing at Colorado Springs, in the county of El Paso and State of Colorado, have invented a new and useful Wheel, of which the following is a specification.

This invention relates to wheels, and refers particularly to the construction of the hub and the manner of connecting the spokes thereto.

The object of the present invention is to provide a simple, cheap, and efficient means for connecting the spokes of a wheel to the hub, the latter being made in sections, so that the parts thereof may be disassociated for admitting of the removal and replacing of spokes as may be found necessary, the hub being also made reversible, so that either side of the wheel may be turned outward.

With these and other objects in view the invention consists in certain novel features and details of construction and arrangement of parts, as hereinafter fully described, illustrated in the drawings, and pointed out in the claim hereto appended.

In the accompanying drawings, Figure 1 is a side elevation of a sufficient portion of a wheel to illustrate the present improvements, a portion of the hub being removed to show the manner of securing the inner ends of the spokes. Fig. 2 is a detail sectional view taken longitudinally through the hub. Fig. 3 is a detail perspective view of the main hub-section. Fig. 4 is a similar view of the axle-box. Fig. 5 is a detail perspective view of the clamp collar or washer. Fig. 6 is a similar view of the nut forming the outer portion of the completed hub. Fig. 7 is a detail view of the inner end of one of the spokes.

Similar numerals of reference designate corresponding parts in the several figures of the drawings.

1 designates a wheel rim or felly provided with the usual sockets for the reduced outer ends of the spokes 2.

3 denotes the main hub-section, which is in the form of a hollow cylinder and provided with an irregular central bore 4, of square, hexagonal, or polygonal shape. The hub-section 3 is provided with a circumferential series of sockets or mortises 5 for the reception of the inner ends of the spokes. The mortises 5 are of dovetail form, having reversely-inclined side walls, and said mortises open out at one side of the hub-section 3 for admitting of the lateral introduction of the spoke ends. The spoke ends are fashioned to conform to the dovetailed sockets, they being wedge-shaped, so that they cannot be withdrawn radially from the hub-section. The inner ends of the spokes are also flared or expanded as they approach their extremities, and they project a short distance beyond or outside of the face of the part 3, thereby adapting the clamp collar or washer 6 to bear firmly against each and every spoke, so as to prevent any possibility of the same rattling or becoming loose. The collar or washer 6 has a dished or slightly-concaved inner surface where it bears against the spoke ends, such construction contributing to the proper fastening of the spoke ends in the hub and preventing any liability of such spoke ends to escape radially from the part 3. The collar or washer 6 fits snugly over an annular flange 7 on the hub-section 3, whereby said hub-section and the collar 6 are preserved in proper concentric relation.

The outer surfaces of the hub-section 3 and the collar 6 are both provided with circular recesses or depressions 8, one of which is adapted to receive the circumferential flange 9 of the axle-box and the other the similar flange 10 of the securing-nut. The axle-box (indicated at 11) is provided at or near its central portion with flattened surfaces 12, corresponding to the shape of the bore 4 in the hub-section 3, so that when the axle-box is inserted through the hub-section 3 it will be prevented from turning therein. The end of the axle-box is also externally threaded, as indicated at 13, to receive the securing-nut 14, which is screwed tightly against the hub-section 3 or the collar 6, as the case may be. The nut 14 is provided with one or more threaded perforations 15, through which may be inserted a corresponding number of set-screws 16, adapted to bear at their inner ends against the axle-box for preventing the backing off of the nut 14.

By means of the construction above described it will be seen that a simple, strong, and durable vehicle-wheel may be set up in a very short space of time, and that by removing the nut, axle-box, and collar one or more spokes may be readily removed and replaced, as may be necessary. It will also be seen that by removing the nut the axle-box may be withdrawn and reversed, thereby enabling either side of the wheel to be presented outward.

It will be understood that the device is susceptible of various changes in the form, proportion, and minor details of construction, which may be accordingly resorted to without departing from the spirit or sacrificing any of the advantages of this invention.

Having thus described the invention, what is claimed as new is—

A wheel-hub comprising a main hub-section provided with a polygonal central bore and with a circular recess on its outer face and an annular flange on its inner face, and having also a circumferential series of spoke-sockets opening out laterally on the inner face of the main hub-section, whereby the ends of the spokes may be inserted laterally into the sockets, a clamp collar or washer adapted to bear with its inner face against the inner face of the main hub-section and form end walls for said sockets, said washer having a central bore to fit over the annular flange on the inner face of the main hub-section, and being provided with a circular recess in its outer face of a diameter equal to that of the similar recess in the outer face of the main hub-section, an axle-box having a polygonal central portion to fit the similarly-shaped bore in the main hub-section and having at one end of the polygonal portion a circumferential flange of a diameter equal to that of the said circular recesses, and at the other end with a threaded rounded portion, and a nut adapted to work on said threaded end of the axle-box and having at its inner end a circumferential flange equal in diameter to the similar flange on the axle-box, the construction being such that the wheel and its hub may be reversed on the axle-box, substantially as described.

In testimony that I claim the foregoing as my own I have hereto affixed my signature in the presence of two witnesses.

JOHN W. WHEELDON.

Witnesses:
JOSEPH E. SCHWEHR,
T. J. SANDFORD.